Feb. 26, 1952 D. B. WICKER ET AL 2,587,020
ALKALI CELLULOSE TEMPERATURE CONTROL
Filed Sept. 10, 1948
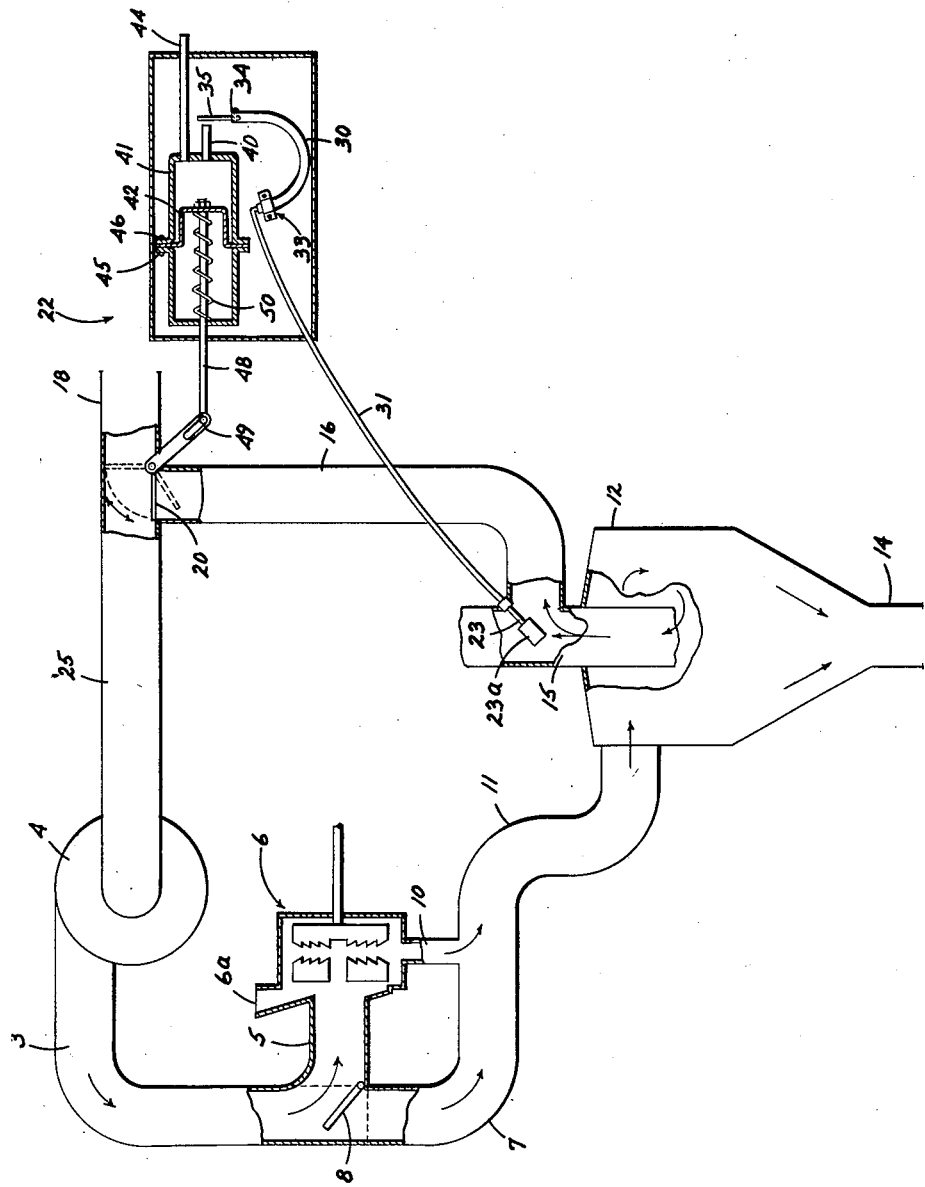
INVENTORS.
DAN B. WICKER
GEORGE C. YEHLING, JR.
JOHN W. MOODY
BY
Thomas R. O'Malley Patented Feb. 26, 1952

2,587,020

UNITED STATES PATENT OFFICE 2,587,020

ALKALI CELLULOSE TEMPERATURE CONTROL

Dan B. Wicker, George C. Yehling, Jr., and John W. Moody, Dunbar, W. Va., assignors to American Viscose Corporation, Wilmington, Del., a corporation of Delaware Application September 10, 1948, Serial No. 48,742

1 Claim. (Cl. 260—233)

This invention relates to the shredding and processing of alkali cellulose into a desirable condition for ageing preparatory to xanthation or other reaction. The usual procedure for preparing alkali cellulose involves the steeping of purified cellulose in a sodium hydroxide solution of about 18 percent concentration. Thereafter the excess steeping solution is removed by pressing to produce an alkali cellulose containing 28 to 33 percent of cellulose fibers. In order to prepare this material for further chemical treatment, it is customary to shred it into fine particles and to ripen the shredded material in order to reduce the degree of polymerization to a satisfactory state. It is important that the temperature at the beginning of this ripening period be precisely controlled in order that the ripening will proceed at a controlled rate and that the temperature at the end of the ripening period will be uniform from batch to batch and permit proper control of subsequent treatment such as xanthation.

It is customary to shred the pressed alkali cellulose in batch shredding machines known as "Pfleiderers." These consist of two-blade kneading mills of the type commonly called "dough mixers." These Pfleiderers are equipped with brine jackets for temperature regulation which may be controlled either manually or automatically. Some of the more modern processes have developed continuous shredding machines which are specially adapted attrition mills. Various temperature control means have been employed, such as brine jacketing a portion of the mill, the use of pre-cooled air and the like. In still other installations, the continuous shredder is followed by a batch mixer of the Pfleiderer type, the sole purpose of which is to control the final temperature to a uniform value.

It is an object of this invention to provide accurate temperature control of alkali cellulose undergoing comminution or shredding so as to maintain it in a suitable condition for ripening. Still another object is to provide highly responsive automatic means simple in design, maintenance and operation for effecting temperature control of alkali cellulose during processing or conveying preparatory to ageing. Other objects, features and advantages will be apparent from the following description and the single figure drawing illustrating the invention.

The present invention comprises a method for controlling the temperature of a moist or liquid-permeated, comminuted, or shredded alkali cellulose material by suspending or carrying the material in a gaseous stream controlled to a desired vapor content. The vapor content of the gaseous medium is such that the liquid carried by the solid material readily evaporates into the medium. The amount of vapor carried by the medium such as air or other gas, is controlled to give an evaporation rate which produces a desired cooling effect in the material. The vapor content of the medium may be varied and controlled as hereinafter described by mixing two supply streams of gaseous medium into the duct system at an inlet region, of which one stream has a relatively low vapor or moisture content and the other has a higher content. The supply stream having the higher vapor content may come from an independent source or may consist of recirculated exhaust gas from the duct system. The relative amounts of the supply streams taken into the system at the inlet region is determined by automatic means responsive to a wet bulb temperature measuring means contained in the duct system at a point as in the exhaust region thereof, or a region provided for separating the solid material from the gaseous medium.

In the drawing illustrative of the invention, air or other gas is forced along the duct 3 by a fan 4. The duct 3 terminates in a junction with a duct 5 which leads into a shredder 6. A hopper 6a or other feeding device constitutes means for feeding wet solid material to be disintegrated into the shredder 6. Another duct 7 extending from the junction connects with the discharge duct 10 of the shredder and serves as a by-pass therearound. A valve 8 located within the junction of ducts 3, 5, and 7 controls the ratio of gas by-passed around the shredder through duct 7 from the duct 3.

In this manner the stream or air or other gas passing through the shredder 6 may be adjusted to any velocity necessary to carry the shredded material away from the mill along duct 10. The shredded material enters the duct 11 to be carried to a gas-solid separating device such as a cyclone separator 12. That section of duct 11 extending between duct 10 and cyclone separator 12, constitutes the zone through which shredded material passes while being subjected to temperature correction preparatory to the ripening process. The gas-solid mixture which enters the separator 12 drops the solid material and it gravitates through a duct 14 into a receptacle not shown; the gas or air is discharged from the separator through the upwardly extending duct 15. The air discharged through the duct 15 contains considerable vapor originally carried by the comminuted material which entered the shredder 6 but was given up to the surrounding air or gas while being carried through the ducts 10 and 11 and the separator 12. The humidity of this air as compared with the air traveling through duct 3 indicates the degree of evaporation which the liquid carried by the shredded particles through duct 11 has undergone. Such evaporation causes cooling of the shredded material passing through duct 11 proportional to the amount of moisture picked up by the air traversing this region.

A portion of the air passing out of separator 12 flows into the duct 16 to be mixed with air which enters the system from the atmosphere through duct 18 under the suction produced in the duct 25 by the fan 4. A valve 20 determines the ratio of the moist air from duct 16 to be mixed with relatively drier air from duct 18. The valve 20 is automatically controlled by a regulator 22, hereinafter described, responsive to a humidification measuring device such as the wet bulb thermometer 23. As the humidity of the air passing through separator 12 decreases, the wet bulb temperature drops. A drop in temperature is communicated by the thermometer 23 to the regulator 22 which moves the damper 20 to a position which permits a greater amount of moist air from the duct 16 to flow into duct 25 thus raising the humidity of the air entering the shredder 4. As a result, the rate of evaporation of liquid from the solid carried by the air decreases, less cooling of the solid particles takes place, and consequently the particles leave the system at a higher temperature. However, if the humidity in the system becomes higher, the temperature as recorded by the wet bulb thermometer 23 rises and the regulator 22 acts to restrict the flow of air from duct 16 into duct 25. Consequently, drier air is then fed into the circulating system. Evaporation of liquid from the solid is increased and the temperature of the solid material is lowered.

The regulator used to control the valve 20 may be any of the various known or manufactured types of apparatus responsive to changes in temperature communicated to it. In the embodiment illustrated, the bulb 23 contains a heat expansible fluid which may flow to an element 30 in the regulator through a capillary tube 31. The element 30 consists of a hollow open-ring shaped container which tends to straighten when the interior thereof is subjected to an increase in fluid pressure. The end 33 is secured to the wall of the regulator leaving the end 34 free to move in response to changes in pressure within its interior. A rigid element 35 is attached to the free end 34 of the container 30. Lever 35 extends over an orifice contained within the end of a tube 40. Tube 40 is connected to a chamber 41 which contains a flexible diaphragm 42 which is held in sealed engagement between flanged portions 45 and 46 of opposite shell members of the chamber 41. A uniform current of fluid, preferably air or a gas, is maintained through a tube 44 into the end of the chamber 41 connected also with the tube 40. If the lever 35 stands away from the orifice of tube 40, the gas or air may escape freely through the orifice. However, when the lever 35 is over the orifice in such a manner as to restrict the flow of gas therefrom, pressure tends to build up in chamber 41 and force the diaphragm 42 towards the opposite end of chamber 41 carrying with it the push rod 48 which is connected at one end to a valve control lever 49 and secured at the other end to the diaphragm 42.

In operation, any increase of wet bulb temperature in the duct 15 causes an expansion of fluid in the thermometer bulb 23. The fluid flows through the tube 31 to the open-ring shaped member 30 which is straightened slightly from an increase in pressure. The consequent movement of the end 34 of member 30 causes the lever 35 to be lifted away from the orifice of tube 40. The subsequent escape of gas from chamber 41 produces a lowering of pressure in the chamber which permits the diaphragm 42 urged by a spring 50 to move towards the left as viewed in the drawing. Movement of the push rod 48 and the diaphragm 42 toward the right moves the valve 20 toward a position in which it closes the entrance of duct 16 into the inlet duct 25 to permit more gas or air to enter duct 25 from the atmosphere, or a reserve gas supply if another gas is used, through duct 18. Appreciable gas entering the system from duct 18 reduces the vapor content of the gas throughout the circulating system. When the vapor content of the gas is low, vaporization increases at the wet wick 23a of the thermometer bulb and produces a cooling effect about exterior of the bulb which brings about a shrinkage in the volume of fluid contained therein and a decrease in the pressure within the member 30. As the pressure becomes less, the member 30 becomes more curved, and the lever 35 tends to close the orifice to tube 40 and restrict the escape of air. As a result, pressure builds up within the chamber 41 forcing the push rod 48 and diaphragm 42 to the left thus progressively opening the valve 20 with respect to duct 16 but progressively closing it with respect to duct 18. In this manner, therefore, a regulator such as the one described may be used to maintain vapor equilibrium based on a desired wet bulb temperature in the air or gas circulated by the apparatus of the invention.

If the air current circulated by the system described is not saturated with moisture and the shredded particles are brought into intimate contact with air, vaporization of the moisture in the alkali cellulose will occur. Inasmuch as the water vapor is carried away from the moist particles by diffusion, the rate of evaporation will be proportional to the area of the particle and to the difference between the vapor pressure of the moisture in the particle and the partial pressure of water vapor in the surrounding air. If the initial particle temperature is higher than that of the air, it will be cooled by evaporation and also by heat transfer from the particle to the air. This will lower the temperature by means described above and the current of blended air is passed through the mill or used for conveying from its outlet. Thereafter, it proceeds through a conduit to suitable separating means which may be a centrifugal air separator of conventional design. In the course of shredding, transferring, and separating the air and alkali cellulose, the two phases receive such intimate mixing at high velocity that conditions of dynamic equilibrium are substantially approached and the small amount of heat developed as a consequence of the mechanical action of shredding is removed by the evaporation of a very small percentage of the moisture in the particles, as well as by transfer of heat directly to the air. After the air current has been divested of solid material in the separator, a wet bulb thermometer is exposed to it and the signal from this thermometer is conducted to a regulator of suitable design to proportion the air supplied to the shredder and/or conveying means following the shredder, in such a manner that a constant wet bulb value is maintained. It is to be observed that the reading of the wet bulb thermometer will be lower than the temperature of the particles of alkali cellulose. However, if the one is regulated to a constant value, the other will also be regulated to a constant value, and by allowing a suitable differential, any desired temperature of alkali cellulose within any suitable range may be obtained.

While a preferred embodiment of the invention has been shown, it is to be understood that changes and variations may be made without departing from the spirit and scope of the invention as defined in the appended claim.

We claim:

A method for treating moist alkali cellulose comprising shredding the alkali cellulose, cooling the shredded alkali cellulose to a predetermined substantially constant temperature by passing air along a continuous duct system and introducing and suspending the shredded alkali cellulose in the air in one region of the system, separating the alkali cellulose from the air in another region of the system, measuring the wet bulb temperature of the air separated from the alkali cellulose, and controlling the humidity of the air in the system into which the shredded admission to the system of (1) relatively dry air alkali cellulose is introduced by regulating the from the atmosphere and (2) recirculated air from the separating region of the system to maintain a substantially constant wet bulb temperature in the air separated from the alkali cellulose, all of the air being passed through the duct system being derived from the atmosphere and being introduced into and passed through the duct system without being subjected to a heating operation as such, and then ripening the alkali cellulose separated from the system.

DAN B. WICKER.
GEORGE C. YEHLING, JR.
JOHN W. MOODY.

REFERENCES CITED

The following references are of record in the file of this patent:

UNITED STATES PATENTS

| Number | Name | Date |
| --- | --- | --- |
| 1,116,777 | Williams | Nov. 10, 1914 |
| 1,431,145 | Bolling | Oct. 10, 1922 |
| 1,476,637 | Nordstrom | Dec. 4, 1923 |
| 1,523,509 | Braemer | Jan. 20, 1925 |
| 1,786,191 | Carroll | Dec. 23, 1930 |
| 2,033,757 | Crites | Mar. 10, 1936 |
| 2,075,506 | Crites | Mar. 30, 1937 |
| 2,132,656 | Smith | Oct. 11, 1938 |
| 2,285,508 | Goss | June 9, 1942 |
| 2,354,312 | Harlow | July 25, 1944 |
| 2,400,382 | Arnold | May 14, 1946 |
| 2,406,395 | Noel | Aug. 27, 1946 |